Nov. 2, 1948.  J. E. CUNNINGHAM ET AL  2,452,636
METHOD OF MAKING HOLLOW VALVES
Filed Sept. 2, 1944  2 Sheets-Sheet 1
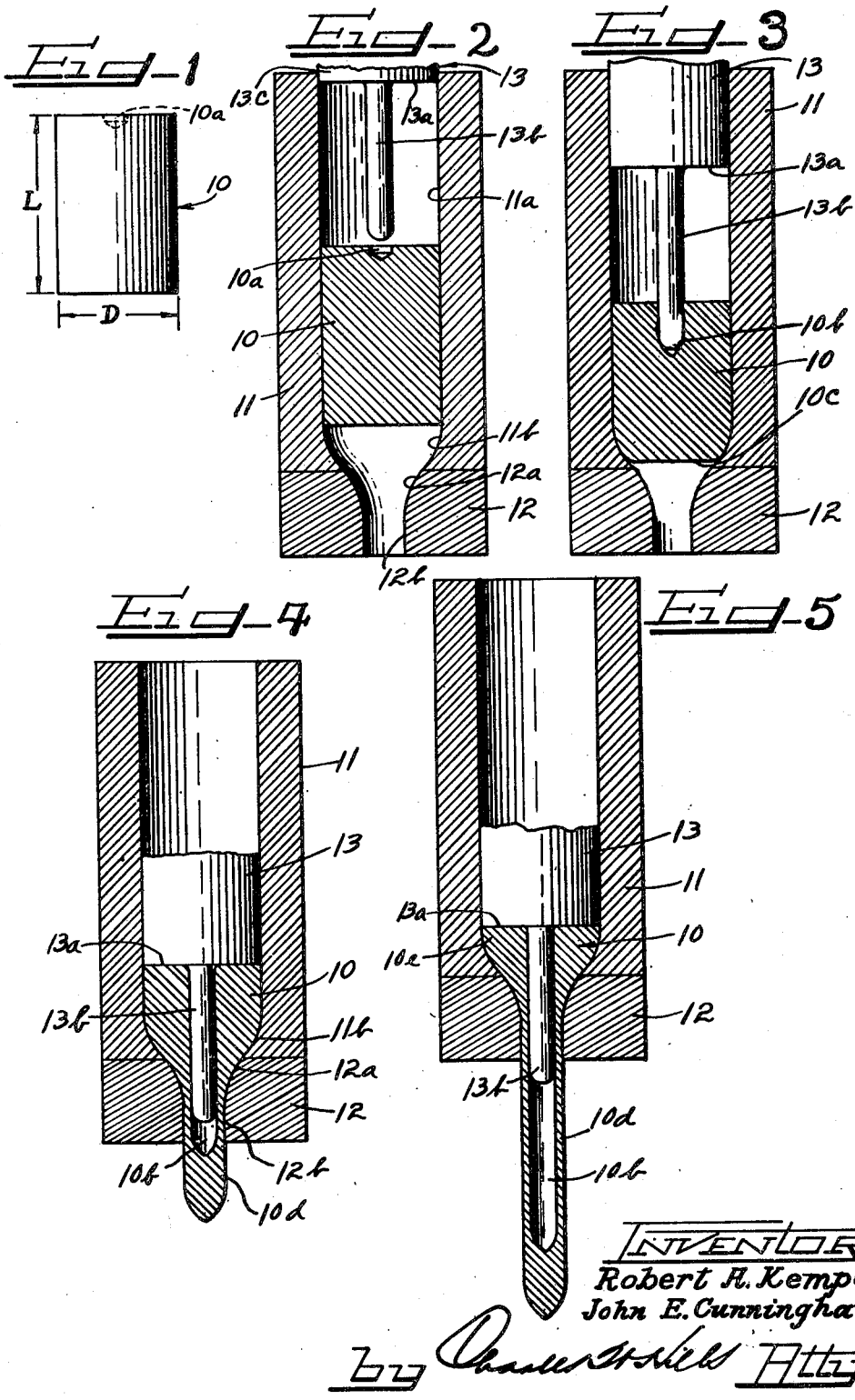

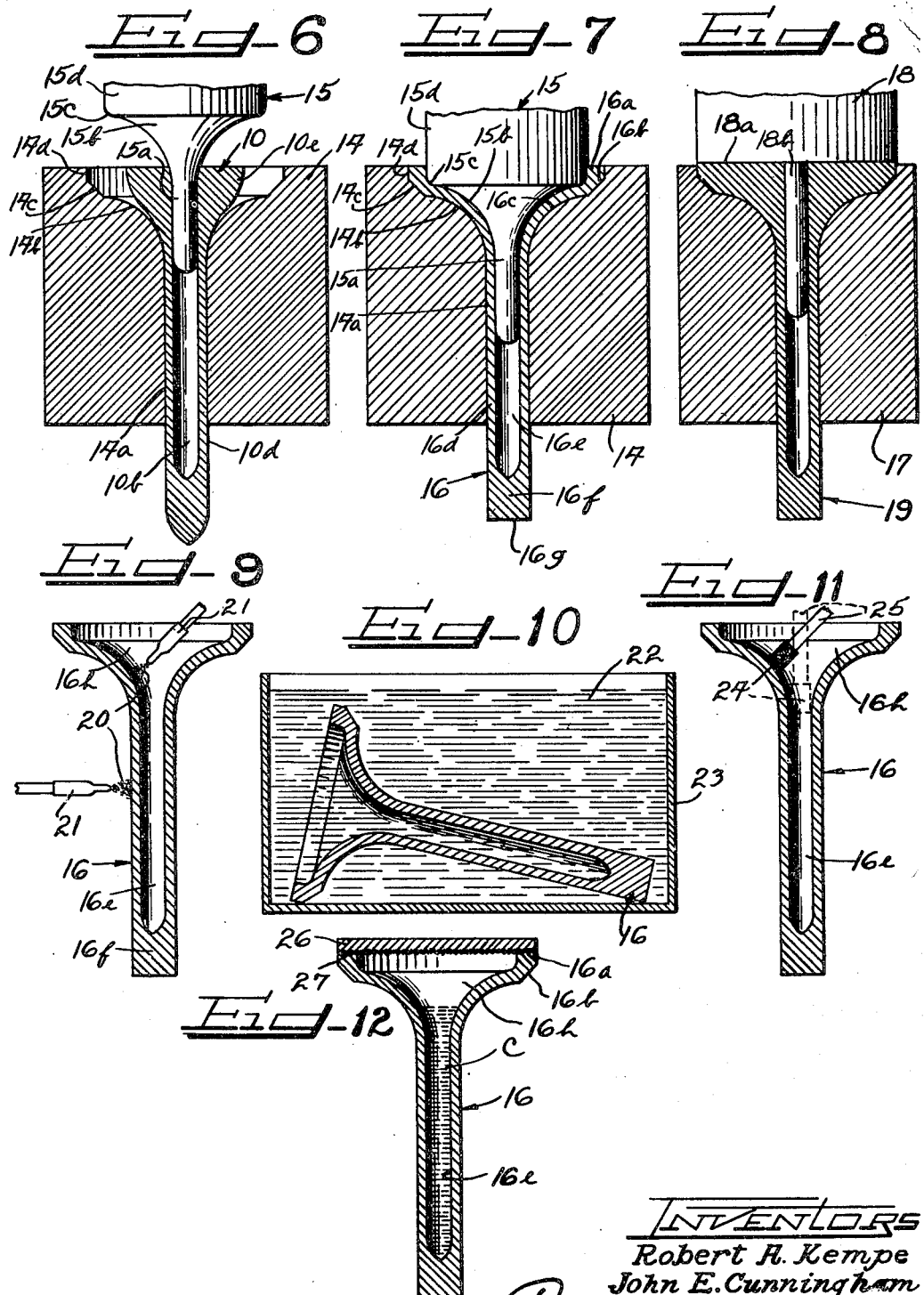

Patented Nov. 2, 1948

2,452,636

UNITED STATES PATENT OFFICE 2,452,636

METHOD OF MAKING HOLLOW VALVES

John E. Cunningham and Robert A. Kempe, Cleveland, Ohio, assignors to Thompson Products, Inc., Cleveland, Ohio, a corporation of Ohio Application September 2, 1944, Serial No. 552,394

2 Claims. (Cl. 29—156.7)

This invention relates to methods of making hollow poppet valves from metal slugs by extrusion and coining operations.

Specifically, the invention relates to methods of making hollow poppet valves from metal slugs or billets by extrusion and coining operations around mandrel inserts without extending the cavities of the valves through the tip ends of the valve stems.

According to this invention, a solid cylindrical metal slug or billet having a diameter less than the desired head diameter for the poppet valve to be made therefrom but greater than the desired stem diameter for the poppet valve is placed in an extrusion die. A plunger or ram having a cylindrical mandrel projecting therefrom is forced into the die for pushing the slug partially through the extrusion throat of the die. The mandrel initially contacts the slug to pierce a cylindrical recess therein. Continued piercing simultaneously forces the slug through the extrusion throat so that the mandrel never projects completely through the slug, and the resulting pierced recess is a closed bottomed cylindrical well. The mandrel prevents collapsing of the well.

The extrusion die reduces the diameter of the slug to about the desired diameter for the poppet valve stem. Obviously, the resulting diameter may be somewhat oversize, to allow for finish machining and polishing operations. The slug is not forced completely through the extrusion die so that the product of the die-pressing operation is a cylindrical hollow stem member with a head thereon. The head has a diameter less than the desired valve head diameter.

After the first extrusion operation, the resulting product is placed in a coining die and acted on by a ram which either has an expanding hollow head-forming portion converging to a leading mandrel end which fits the hollow stem cavity, or a flat active face with a stem-fitting mandrel projecting therefrom. If the former ram is used, the head of the valve in the coining die is shaped and expanded into hollow valve head form. If the latter ram is used, the head of the valve member in the die is merely deformed and expanded into a solid valve head form.

After the coining operation, the valve body is heat-treated, cleaned, polished and filled with a coolant such as sodium. If a hollow head valve body has been made, the head is covered with a cap which is welded thereon preferably by projection welding. If a solid head valve is used, the stem cavity is sealed by means of a welded-in plug. Of course, machining operations can be carried out on the valve body to finish the body to exact desired dimensions.

The valves produced by the method of this invention have one-piece body members defining hollow valve stems and valve heads which can be hollow or solid. The stem cavity terminates short of the tip end of the stem so that the stem has a solid integral closed tip end.

It is, then, an object of the invention to provide an inexpensive method of forming hollow poppet valves adapted for internal combustion engine usage.

A still further object of the invention is to provide a method of forming hollow poppet valves exclusively by extruding and coining operations.

A still further object of the invention is to eliminate the heretofore necessary swaging operations in the production of hollow head poppet valves.

A still further object of the invention is to extrude cylindrical metal billets having diameters intermediate the desired valve stem and valve head diameters partially through an extrusion throat which reduces the billet to valve stem diameter size while carrying out the extrusion operation around an insert pin to create or maintain a cavity in the stem being extruded.

Another object of the invention is to partially extrude metal billets around a pin for forming a headed hollow stem member adapted to be shaped into finished poppet valve dimensions.

Another object of the invention is to eliminate the necessity for sealing pins, welded-on tips, nubbins, and the like on valve stems to close the valve stem cavity.

Other and further objects of the invention will be apparent to those skilled in the art from the following detailed description of the annexed sheets of drawings which, by way of preferred example only, illustrates one embodiment of the invention.

On the drawings:

Figure 1 is a side elevational view of a solid cylindrical metal slug or billet from which the valves of this invention are made.

Figure 2 is a vertical cross-sectional view, with a fragmentary part in side elevation, illustrating the start of the extruding operation on the slug of Figure 1 and showing the position of the slug in the extrusion die before the extrusion operation.

Figure 3 is a view similar to Figure 2 but illustrating the start of the piercing and extruding operations on the solid metal slug.

Figure 4 is a view similar to Figure 3 but illustrating a further advanced stage of the extruding and piercing operations.

Figure 5 is a view similar to Figure 4 but illustrating the completion of the extruding operation.

Figure 6 is a vertical cross-sectional view with a fragmentary part in side elevation illustrating the valve body from the extruding operation mounted in a coining die at the start of the coining operation.

Figure 7 is a view similar to Figure 6 but illustrating the position of the parts and the shape of the valve body at the completion of the coining operation.

Figure 8 is a view similar to Figure 7 but illustrating a different type of coining punch for forming a solid valve head.

Figure 9 is a vertical cross-sectional view of the coined valve body of Figure 7, showing grit-blast nozzles in elevation for removing scale from the valve body.

Figure 10 is a vertical cross-sectional view of a pickling tank illustrating the valve of Figure 9 immersed in the pickling bath.

Figure 11 is a view similar to Figure 9 but illustrating polishing operations on the interior of the valve body.

Figure 12 is a vertical cross-sectional view of the finished valve made from the body of Figure 11.

As shown on the drawings:

In Figure 1 the reference numeral 10 designates generally a solid cylindrical metal slug or billet having a diameter D greater than the desired valve stem diameter but less than the desired valve head diameter and a length L materially less than the desired length of the valve. The billet 10 is composed of any desired valve metal capable of being extruded. A centering recess 10a is formed in one end face of the slug 10.

The slug 10, as shown in Figure 2, is placed in an extruding die 11 having a generally cylindrical recess 11a for a major portion of its length and converging at its lower end along a concave wall 11b to a reduced-diameter outlet opening which mates with a secondary extruding ring 12 having a convexly curved throat 12a mating with the small end of the wall 11b, and converging to a cylindrical stem-receiving hole 12b.

The slug 10 snugly fits the cylindrical wall 11a of the die 11 and, prior to the extruding operation, rests on the upper end of the wall 11b.

An extruding ram or plunger 13 has a flat active end face 13a and a central projecting cylindrical mandrel 13b at the axial center of the active end 13a. The ram has a cylindrical side wall 13c snugly fitting into the cylindrical portion of the die 11 for sliding along the wall 11a thereof.

As illustrated in Figure 3, the mandrel 13b initially acts on the upper end of the slug 10 to pierce a hole 10b which is an extension of the initial recess or centering hole 10a provided in the slug. The force of the mandrel 13b on the slug may start the extruding operation on the bottom end of the slug to form a somewhat reduced end 10c. The active face 13a of the plunger or ram 13 is inactive during this piercing operation, and the extrusion occurs at a slower rate than the rate of piercing until the active face 13a acts on the slug. This extrusion operation during piercing forms a reduced-diameter solid end portion on the slug 10 having the same diameter as the hole 12b of the extrusion ring 12. The mandrel thus moves toward the bottom end of the slug but never projects through this bottom end because some extrusion occurs with the piercing operation.

As illustrative in Figure 4, continued downward movement of the plunger 13 eventually forces the mandrel 13b through the extruding throat 11b and 12a and the active face 13a of the plunger 13 acts on the upper end of the slug 10 to force the slug through the extruding throat while the mandrel prevents collapsing of the pierced hole 10b. A hollow valve stem 10b is thus formed.

As illustrated in Figure 5, the continued extruding operation produces a greatly elongated stem portion 10d from the slug 10 with the mandrel 13 extending further down through the extrusion ring 12 and preventing collapse of the hollow stem. Figure 5 illustrates positions of the parts at the completion of the extruding operation and, as shown therein, the slug still has an unreduced diameter head portion 10e with a neck converging to the stem 10d. The head 10e has a hole therethrough maintained by the mandrel 13b. This hole is of the same diameter as the hole in the stem portion 10d. The head 10e has an average axial depth not appreciably less than the radial thickness thereof to provide sufficient metal for forming an enlarged valve head as hereinafter explained.

As illustrated in Figure 6, the extruded slug 10 with the stem 10d and head 10e is taken from the die of Figure 5 and placed in a coining die 14. This coining die 14 has a cylindrical hole 14a therethrough snugly receiving the stem portion 10d together with an outwardly flaring convex throat portion 14b at the upper end of the portion 14a. The outwardly flaring portion 14b extends to an upwardly inclined flat beveled portion 14c which terminates in an upstanding cylindrical rim wall 14d.

A plunger or ram 15 has a leading end with a cylindrical mandrel portion 15a adapted to snugly fit in the hole 10b of the formed slug. The mandrel 15a flares outwardly along a concave wall 15b to a beveled shoulder 15c. The shoulder diverges outwardly to an upstanding cylindrical wall 15d.

The head 10e of the formed slug is much smaller than the coining die cavity, as illustrated in Figure 6.

The coining operation, as shown in Figure 7, forms from the extruded slug 10, a valve body 16. This valve body 16 has an enlarged head with an upstanding cylindrical rim 16a formed between the cylindrical die and ram surfaces 14d and 15d, a beveled seating face 16b formed between the die and ram surfaces 14c and 15c, a concavo-convex neck 16c formed between the die and plunger surfaces 14b and 15b, and a cylindrical hollow stem 16d preserved by the coining die hole 14a and mandrel 15a. The stem 16d has a cylindrical cavity 16e therein extending to a solid end 16f. The rounded end portion of the extruded slug piece can be cut off to form a flat bottom 16g on the valve body 16.

The valve body 16, as shown in Figure 9 for example, thus has a hollow stem cavity 16e closed at the bottom by an integral solid end portion 16f of the stem together with an enlarged head cavity 16h open at the top thereof.

If desired, the extruded slug of Figure 5 can be placed into the coining die 17 of Figure 8 and acted on by the plunger or ram 18 for producing a hollow stem but solid head valve body 19 wherein the stem cavity extends through the head. As shown in Figure 8, the die 17 has a head-forming cavity similar to the die 14 of Figure 7 but the ram or plunger 18 does not have the expanding portion 15b of the plunger 15. The plunger 18 has a flat, active end face 18a with a central projecting cylindrical mandrel 18b. The flat face 18a of the plunger is effective to coin the head portion 10e of the slug into conformity with the die 17 while the mandrel 18b prevents the cavity 10b of the slug from collapsing during the coining operation.

Figure 8 thus illustrates a modified coining operation to produce a solid head valve having the stem cavity hole extending therethrough.

The metal slug is heated to forging temperatures during the extruding and coining operations and may have scale formed thereon. This scale is removed, as shown in Figure 9, from both the interior and exterior of the valve body 16 by means of grit blasts 20 projected against the interior and exterior surfaces of the valve body by means of nozzles 21 or other grit-impelling devices.

The grit-blasting operation of Figure 9 is carried out on the entire valve body after the last heat treatment operation. In some instances, it may be desired to heat treat the body metal after the coining operation.

If additional cleaning of the metal is desired after the grit-blasting operation of Figure 9, the valve body 16 can be immersed in a pickling bath 22 in a tank 23 as shown in Figure 10. Since the interior cavities of the valve are fully open through the open top of the valve head, the pickling material can readily enter the valve cavities to clean the inside surfaces as well as the outside surfaces of the valve body.

As shown in Figure 11, the cleaned valve body 16 is preferably next subjected to a polishing treatment for removing scratches from the interior of the valve. These scratches frequently form loci for fatigue cracks inside the valve, resulting in rupture of the valve. For the polishing operation, abrasive material 24 is mounted on a tool shaft 25 which can be rotatably driven and all scratches are polished out of the cavities 16e and 16h of the valve. Since the valve body is wide open at the top, removal of the scratches is facilitated. Heretofore the polishing operation had to be carried out through a small hole in the tip end of the valve stem. Polishing of an enlarged cavity such as 16h in the valve head was not possible heretofore.

The polished valve body 16 next has the cavity 16e and a part of the cavity 16h thereof filled with coolant "C" (Figure 12) such as sodium, and a flat metal disk or cap 26 is welded to the upstanding rim 16a of the valve body around the entire periphery of the rim to form a weld line 27. The welding operation is preferably carried out by passing electric current through the pressed-together portions to simultaneously create the entire weld line 27 without heating the body metal except at the weld area.

The valve of Figure 12 is free from any weld lines, plug inserts, or the like separate parts at the tip end thereof. The cap or cover disk 26 for the valve, if desired, can be composed of cast, corrosion-resistant metal.

The coining and extruding operations for forming the valve body 16 preferably work the metal only in the direction of the metal grain bands, thereby eliminating exposure of grain band ends except at the stem tip and the rim 16a of the valve body. This rim 16a, however, is covered by the cap 26. The seating face 16b of the valve head is thus formed entirely by the sides of the metal grain bands, and is tough and resistant to corrosion.

From the above descriptions it should be understood that the invention provides methods for making hollow stem poppet valves or hollow head and stem poppet valves from solid metal slugs by inexpensive, simple extruding and coining operations. The valves of this invention have one-piece bodies defining the entire valve stem, valve neck, and valve seat parts of the valve with either a small, welded-in plug or a welded-on cap closing the top end of the valve.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. The method of making bodies for hollow stem and hollow head poppet valves from a flat faced solid cylindrical metal billet having a diameter intermediate the stem and head diameter of the valve which comprises piercing the central portion of the flat face of the solid billet to a depth inwardly from said face, simultaneously extruding the opposite end of the billet at a much slower rate than the rate of piercing for positioning the piercing tool in the path of the extruding metal, terminating the piercing operation before the piercing tool penetrates the extruding end of the billet, continuing the extruding operation alone to extrude a portion of the billet only to valve stem diameter size while said piercing tool prevents the extruding metal from collapsing to maintain the pierced hole in the extruded valve stem, terminating the extruding operation materially short of the flat faced pierced end of the billet and without deforming the flat face to maintain an end on the extruded member having the same diameter as the original billet and said end having an average axial depth not appreciably less than the radial thickness thereof, coining said pierced non-extruded end of the billet between coining surfaces which shape said end into valve head size and shape, and simultaneously expanding the valve head to form an enlarged valve cavity bounded by an upstanding flat topped rim wall terminating at the original flat face of the billet.

2. The method of making bodies for hollow poppet valves from a solid cylindrical metal billet having a diameter intermediate the stem and head diameter of the valve which comprises piercing the central portion of one end face of the solid billet to a depth inwardly from said one end face, simultaneously extruding the opposite face of the billet at a much slower rate than the rate of piercing for positioning the piercing tool in the path of the extruding metal, terminating the piercing operation before the piercing tool penetrates the extruding end of the billet, continuing the extruding operation alone to extrude a portion of the billet only to valve stem diameter size while said piercing tool prevents the extruding metal from collapsing to maintain the pierced hole in the extruded valve stem, terminating the extruding operation materially short of said one end face of the billet without substantially deforming said end face to maintain an end on the extruded member having the same diameter as the original billet and said end having an average axial depth not appreciably less than the radial thickness thereof, coining the non-extruded end of the billet between coining surfaces which shape said end into valve head size and shape to provide a valve head with an opening bounded by an upstanding rim wall having an end face terminating in the original end face of said one end of the billet.

JOHN E. CUNNINGHAM.
ROBERT A. KEMPE.

REFERENCES CITED

The following references are of record in the file of this patent:

UNITED STATES PATENTS

| Number | Name | Date |
| --- | --- | --- |
| 682,560 | Keithley | Sept. 10, 1901 |
| 1,294,416 | Dady | Feb. 18, 1919 |
| 1,468,092 | Towne | Sept. 18, 1923 |
| 1,683,077 | Joyce | Sept. 4, 1928 |
| 1,702,310 | E. G. Oakley | Feb. 19, 1929 |
| 1,724,426 | Schweinert | Aug. 13, 1929 |
| 1,824,323 | Boyle | Sept. 22, 1931 |
| 1,980,716 | Colwell | Nov. 13, 1934 |
| 2,093,773 | Colwell | Sept. 21, 1937 |
| 2,140,775 | Talbot-Crosbie | Dec. 20, 1938 |
| 2,354,947 | Colwell | Aug. 1, 1944 |

FOREIGN PATENTS

| Number | Country | Date |
| --- | --- | --- |
| 524,146 | Great Britain | July 31, 1940 |